United States Patent [19]

Brown

[11] 4,319,756

[45] Mar. 16, 1982

[54] SPHERICAL SEAL ELEMENT

[75] Inventor: John E. Brown, Mansfield Woodhouse, England

[73] Assignee: West & Sons Engineers Limited, Nottinghamshire, England

[21] Appl. No.: 125,102

[22] Filed: Feb. 27, 1980

[51] Int. Cl.³ ............................................... F16J 15/32
[52] U.S. Cl. ....................................... 277/58; 277/205; 277/214; 403/131; 403/137
[58] Field of Search ................. 251/214; 277/205, 206, 277/31, 58; 403/131, 137, 121, 90, 76; 285/160, 166, 261

[56] References Cited

U.S. PATENT DOCUMENTS

| 2,176,355 | 10/1939 | Otis | 277/31 |
| 2,192,805 | 3/1940 | Seamark | 277/31 |
| 3,028,183 | 4/1962 | Phillips | 403/76 |
| 3,356,333 | 12/1967 | Scaramucci | 277/205 |
| 3,445,087 | 5/1969 | Priese | 237/214 |
| 3,776,558 | 12/1973 | Maurer | 277/58 |
| 3,778,070 | 12/1973 | Shimura | 277/58 |

Primary Examiner—Robert I. Smith

[57] ABSTRACT

The present invention relates to a seal which is capable of sealing against and rotatably supporting a spherical formation.

The seal 10 has at least one annular lip portion 12 which has at least one sealing surface 18, 19 which is spherically contoured to sealingly engage the spherical formation 40. The lip portion is resilient in an axial direction but rigid enough to resist compressive deformation.

The seal is particularly useful for sealingly supporting a hopper stirring member which extends through a wall of the hopper.

6 Claims, 4 Drawing Figures

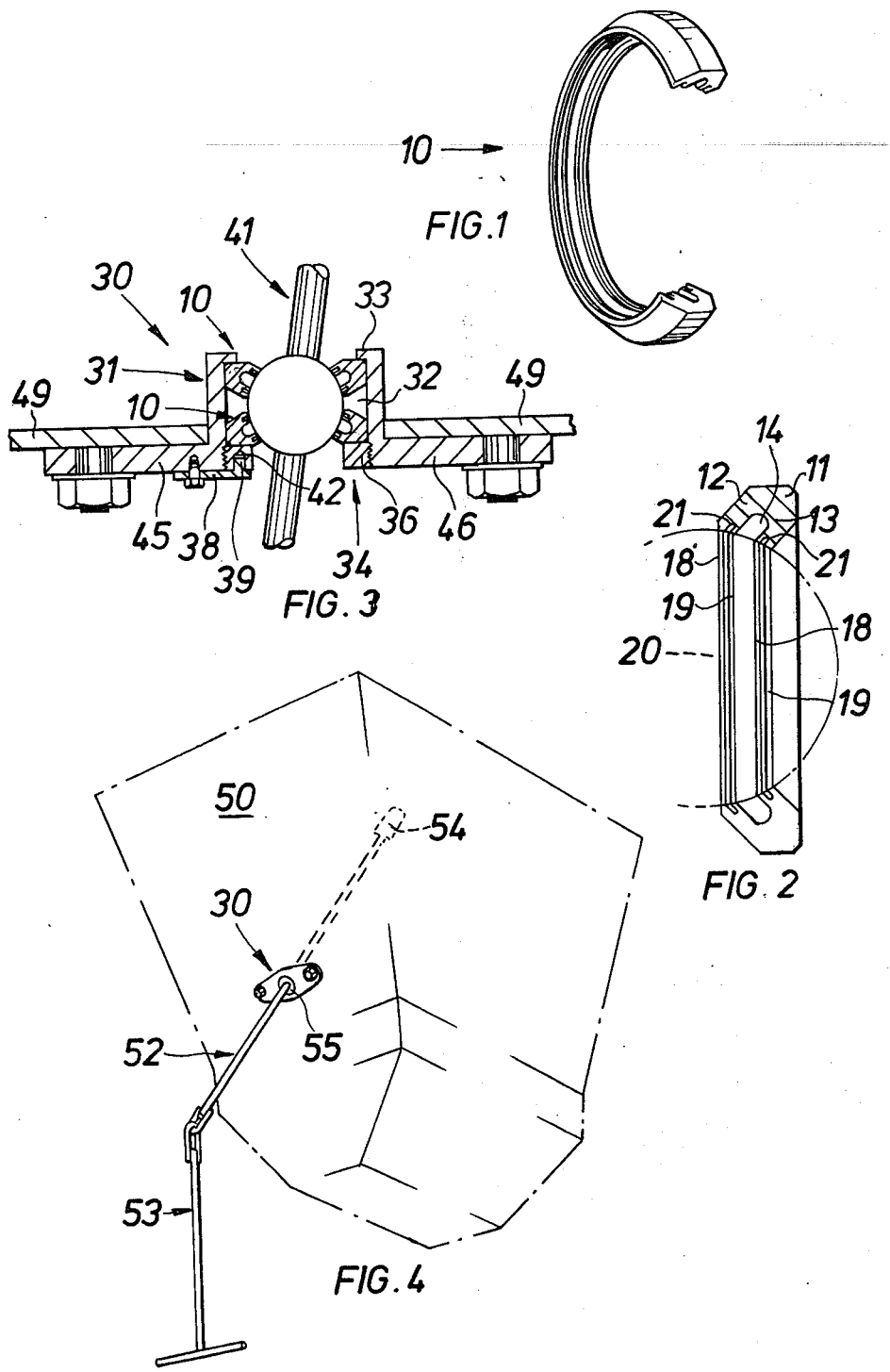

SPHERICAL SEAL ELEMENT

The present invention relates to a seal assembly for providing a seal between a spherical surface and a housing, and in particular relates to a seal assembly for providing a seal between a stirring member and the wall of a hopper through which it passes.

When a hopper for receiving particulate material which tends to conglomerate, such as ash, is provided with a valve for closing its outlet, it is possible for the material to form a bridge across the outlet thus preventing the hopper from emptying when the valve is open. In order to break down the bridge and so ensure free passage of the particulate material through the hopper it is known to provide a stirring member which extends from the exterior of the hopper through a wall of the hopper.

The stirring member is usually provided with a spherical formation which is rotatably housed in a seal housing in order to pivotally connect the stirring member to the hopper wall. The seal housing is normally filled with a stuffing material in order to provide a seal so as to prevent dust from escaping from the hopper.

According to one aspect to the present invention there is provided a seal element for sealingly engaging a spherical surface, the seal element having an annular lip portion having a spherically contoured sealing face for contacting the spherical surface.

The lip portion is made of a suitable plastics material which enables the lip portion to be resilient in an axial direction yet rigid enough to resist compressive deformation. Accordingly the seal element, in use, not only provides a sealing function but may also be used to provide a bearing support. Suitable plastics material are polyamides such as Nylatron as produced by Polypenco Limited.

Preferably, the lip portion is provided with more than one sealing face. Additionally more than one lip portion may be provided so as to provide a plurality of side sealing faces. This has the advantage of increasing the number of sealing contacts by which the media to be sealed has to pass, and also increases the surface contact between the seal element and the spherical surface so that loadings on the seal element from the spherical surface are evenly distributed over large surface area.

Advantageously the or each lip portion is inclined to the axis of the seal element.

According to another aspect there is provided a seal assembly including a housing for receiving a member having a spherical surface and at least one seal element as defined above arranged to sealingly engage against the housing and against the spherical surface when received in the housing.

Preferably, the housing contains a pair of sealing elements, each sealing element having at least one radially inwardly directed lip portion defining an aperture which has a smaller diameter than the spherical surface, the seal elements being located in opposition to one another so as to support the spherical surface therebetween.

Advantageously displacement means are provided to axially move the opposed seal elements toward one another thereby inducing a resilient loading on the lip portions.

According to another aspect of the present invention there is provided a hopper having a stirring member passing through a wall of the hopper, the stirring member having a spherical formation which is sealingly supported in a seal assembly as defined above.

Reference is now made to the accompanying drawings, in which:

FIG. 1 is a broken away perspective view of a seal element according to the present invention;

FIG. 2 is an axial sectional view of the seal element in FIG. 1;

FIG. 3 is an axial section through a seal assembly according to the present invention;

FIG. 4 is a schematic prespective view of a hopper having a stirring member supported in a seal assembly as shown in FIG. 3.

Stirring initially to FIGS. 1 and 2 there is shown an annular seal element 10 which has a body portion 11 from which radially extends a pair of lip portions 12 and 13. The lip portions 12 and 13 are separated by an annular groove 14 so that each lip portion may be axially deflected. Each lip portion terminates in a pair of sealing faces 18, 19 which are spherically contoured for sealingly engaging a spherical surface 20 as shown in FIG. 2. The seal faces 18, 19 are separated by a shallow groove 21.

As clearly seen in FIG. 2 each lip portion is inclined to the axis of the seal element so that in use the lip portions are directed toward the centre of the spherical surface being sealed.

The seal element 10 is preferably made in one piece from a suitable plastics material which will enable each lip portion to be resiliently deflected axially but which will resist compressive deformation radially outwardly from the axis of the seal. A suitable plastics material is polyamide such as Nylatron (R.T.M.) as supplied by Polypenco Limited. It is to be appreciated that the seal element may be made from any other material which possesses the necessary characteristics.

In FIG. 3 there is shown a seal assembly 3a which includes a housing 31 having an internal bore 32. A shoulder 33 is provided at one end and displacement means 34 in the form of an externally threaded annulus 36 is provided at the other end.

Located between the shoulder 33 and annulus 36 is a pair of opposed seal elements 10 which support therebetween a spherical formation 40 of elongate member 41. The annulus 36 is rotated in order to axially move the opposed seal elements toward one another thereby placing the lip portions under a resilient loading. The annulus 36 is locked in position by a plate member 38 bolted to the exterior of the housing, the plate member 38 having a projection 39 cooperating with bores 42 spaced circumferentially about the annulus 36.

The housing is provided with a pair of flanges 45 and 46 each having bolt holes 47 in order to enable the housing to be bolted to a wall 49.

In FIG. 4 a hopper 50 is shown having a stirring member 52 which has a handle 53 at one end and a paddle 54 at the other end. The member 52 has a spherical formation 55 sealingly supported in a seal assembly as shown in FIG. 3.

I claim:

1. A bush unit for supporting and sealing a spherical member, the bush unit including in combination housing means having an internal bore formed therein, a pair of opposed annular seal elements which are axially movable toward one another supported by said housing means within said bore, each annular element having a radially inwardly directed lip portion adapted to abut with the spherical member, the sealing face of one seal element being arranged to face the sealing face of the other seal element so as to define a spherical seat in which the spherical member is adapted to be rotatably supported, each radially inward directed lip portion bridging a space in the bore between said housing means and the spherical member, the lip portion of each annular element being rigid enough to maintain said spherical seat when the annular elements are moved axially toward one another to place each element under axial compression for urging sealing contact between each spherically contoured sealing face and the spherical member.

2. A bush unit according to claim 1, wherein the lip protion of each annular element is provided with more than one sealing face.

3. A bush unit according to claim 2, wherein for each annular element more than one lip portion is provided so as to provide a plurality of side by side sealing surfaces.

4. A bush unit according to claim 1, wherein each annular element is formed of a plastic material.

5. A bush unit according to claim 4, wherein the plastic material is a polyamide.

6. A combined hopper and stirring means including a hopper formed by wall means, a stirring member passing through said wall means and having a spherical member formed thereon, a bush unit formed in the wall means having said spherical member sealingly supported therein, the bush unit including in combination housing means having an internal bore formed therein, a pair of opposed annular seal elements which are axially movable toward one another supported by said housing means within said bore, each annular element having a radially inwardly directed lip portion adapted to abut with the spherical member, the sealing face of one seal element being arranged to face the sealing face of the other seal element so as to define a spherical seat in which the spherical member is adapted to be rotatably supported, each radially inward directed lip portion bridging a space in the bore between said housing means and the spherical member, the lip portion of each annular element being rigid enough to maintain said spherical seat when the annular elements are moved axially toward one another to place each element under axial compression for urging sealing contact between each spherically contoured sealing face and the spherical member.

* * * * *

UNITED STATES PATENT AND TRADEMARK OFFICE
CERTIFICATE OF CORRECTION

PATENT NO. : 4,319,756
DATED : March 16, 1982
INVENTOR(S) : John Eric Brown

It is certified that error appears in the above—identified patent and that said Letters Patent is hereby corrected as shown below:

Column 2, line 14, "Stirring" should be --Referring--.

Signed and Sealed this

Twenty-ninth Day of June 1982

[SEAL]

Attest:

Attesting Officer

GERALD J. MOSSINGHOFF

Commissioner of Patents and Trademarks